United States Patent [19]

Blaine et al.

[11] Patent Number: 5,494,702

[45] Date of Patent: Feb. 27, 1996

[54] PROTECTIVE SOLVENT FREE LIQUID MASKING COMPOUNDS AND RELATED METHOD

[75] Inventors: Sally J. Blaine, North Canton; Kim K. Wilson, Canton, both of Ohio

[73] Assignee: Alco Industries, Inc., Valley Forge, Pa.

[21] Appl. No.: 262,856

[22] Filed: Jun. 21, 1994

[51] Int. Cl.$^6$ .................................................. B65B 33/00
[52] U.S. Cl. .............................. 427/154; 106/2; 427/155; 427/156; 427/282; 524/379; 524/388; 524/557
[58] Field of Search ................................. 427/154, 155, 427/156, 282; 106/2; 524/379, 388, 557

[56] References Cited

U.S. PATENT DOCUMENTS

| | | | |
|---|---|---|---|
| 2,020,256 | 11/1935 | Copeman | 91/68 |
| 2,082,791 | 6/1937 | Copeman | 280/152 |
| 2,275,578 | 3/1942 | Wood | 106/2 |
| 2,420,720 | 5/1947 | Pechukas | 117/6 |
| 2,603,574 | 7/1952 | Holmes | 117/6 |
| 3,114,650 | 12/1964 | Oppenheim et al. | 117/6 |
| 3,146,883 | 9/1964 | Harlan et al. | 206/59 |
| 3,201,274 | 8/1965 | Hobbs, Jr. | 117/128.4 |
| 3,202,554 | 8/1965 | Hornus | 148/22 |
| 3,218,183 | 11/1965 | Fritzsching et al. | 117/15 |
| 3,423,225 | 1/1969 | Coney | 117/6 |
| 3,445,275 | 5/1969 | Bogart | 117/124 |
| 3,492,258 | 1/1970 | Kremer | 260/27 |
| 3,620,796 | 11/1971 | Gordy | 117/6 |
| 3,625,727 | 12/1971 | Lightfoor et al. | 117/6 |
| 3,696,498 | 10/1972 | Leontaritie et al. | 29/424.72 |
| 3,712,829 | 1/1973 | Steigelman | 117/54 |
| 4,053,666 | 10/1977 | Taylor et al. | 425/35 |
| 4,055,441 | 10/1977 | Taylor et al. | 132/10 |
| 4,145,855 | 3/1979 | Sheldon | 52/232 |
| 4,169,088 | 9/1979 | Hansen | 260/29.6 |
| 4,199,620 | 4/1980 | Edwards et al. | 427/156 |
| 4,200,671 | 4/1980 | Krajewski et al. | 427/154 |
| 4,222,922 | 9/1980 | Rees | 260/29.6 |
| 4,287,103 | 9/1981 | Francis et al. | 260/17 |
| 4,428,857 | 1/1984 | Taylor et al. | 251/193 |
| 4,456,731 | 6/1984 | Caporossi et al. | 525/61 |
| 4,592,756 | 6/1986 | Kawasaki et al. | 8/527 |
| 4,612,058 | 9/1986 | Geke et al. | 134/38 |
| 4,634,607 | 1/1987 | Ernsberger | 427/282 |
| 4,748,049 | 5/1988 | Charles et al. | 427/156 |
| 4,759,959 | 7/1988 | Buy | 427/282 |
| 4,792,464 | 12/1988 | Martenson | 427/156 |
| 4,844,833 | 7/1989 | Komatsu et al. | 252/174.13 |
| 5,026,597 | 6/1991 | Franz et al. | 428/323 |
| 5,143,949 | 9/1992 | Grogan et al. | 523/334 |
| 5,183,688 | 2/1993 | Sorko-Ram | 427/164 |
| 5,186,978 | 2/1993 | Woodhall et al. | 427/154 |

FOREIGN PATENT DOCUMENTS

| | | |
|---|---|---|
| 454888 | 3/1949 | Canada . |
| 18563 | 10/1963 | Sweden . |
| 2191717A | 12/1987 | United Kingdom . |

*Primary Examiner*—Michael Lusignan
*Attorney, Agent, or Firm*—Renner, Kenner, Greive, Bobak, Taylor & Weber

[57] ABSTRACT

Solvent free liquid masking compositions comprise from about 5 to about 20 percent by weight of an aliphatic polyol; from about 5 to about 20 percent by weight of a plasticizer; from about 0.1 to about 1 percent by weight of a surfactant; and sufficient water to total 100 percent by weight. A method for protecting selected surfaces from paint in painting operations comprises applying a solvent free liquid masking composition to selected surfaces of an object where paint subsequently applied is not desired; allowing the liquid masking composition to dry, forming a film; painting the object, whereby surfaces carrying the film are protected from the application of paint; and removing the film.

16 Claims, No Drawings

PROTECTIVE SOLVENT FREE LIQUID MASKING COMPOUNDS AND RELATED METHOD

TECHNICAL FIELD

This invention relates to protective coating materials which are applicable to surfaces in liquid form; which quickly dry and which can subsequently be removed by washing with water. Their principal utility is as a mask so that in operations such as painting, areas covered by this coating do not become painted. Although the mask may receive some paint, when it is removed, the underlying surface is then clean and paint-free. Such coatings are generally applied to vehicles in lieu of masking paper which is a time-consuming operation. The coating would also have utility in the transport of new cars or related vehicles. Because these vehicles are stacked for movement via truck or rail, it is customary to apply a protective coating to protect the finish of underlying vehicles from oil and grease deposits as well as other dirt and grime received during transportation.

BACKGROUND OF THE INVENTION

Liquid masking compounds are not new. The principal ingredient thereof is a water-soluble polymer material that is formulated and applicable as a liquid and which readily dries to from a polymeric film. The film should not have a great affinity for the underlying surface so that it can readily be removed when desired by peeling away of the dry film or washing to dissolve the film which is simultaneously removed.

The patent literature does include films of this type. U.S. Pat. No. 5,186,978, for instance, is directed toward a liquid masking compound which comprises water, an aliphatic polyol such as polyvinyl alcohol, an alcohol and a surfactant. Methods protecting various surfaces are disclosed in conjunction therewith.

U.S. Pat. No. 5,183,688 discloses a so-called water-based resist material which comprises water, polyvinyl alcohol, isopropyl alcohol, a surfactant and cornstarch. This resist material is used in conjunction with applying advertising messages onto convex acrylic mirrored surfaces.

U.S. Pat. No. 5,026,597 is directed toward temporary protective coating comprising a water-soluble polymeric film and insoluble inert particles such as polyethylene and acrylic beads which act as spacers. Such coatings are applied to glass and polymeric sheet surfaces and the beads act as spacers when the sheets are stacked.

U.S. Pat. No. 4,222,922 is directed toward a warp size composition for polyester filaments which comprises polyvinyl alcohol, a cationic surfactant and a polyhydric alcohol plasticizer, such as glycerol.

While attempts have been made heretofore to formulate liquid masking compounds and protective coatings for a variety of purposes, the art has not provided a polyvinyl alcohol-based composition devoid of alcohol or other such volatile materials for use as a paint-masking film or for other purposes where it is desirable to apply the film as a liquid and subsequently remove the dried film by washing.

SUMMARY OF THE INVENTION

It is therefore, an object of the present invention to provide a solvent free liquid masking composition which is based upon a water-soluble film-forming polymer.

It is another object of the present invention to provide a solvent free liquid masking composition that is devoid of alcohols and other solvents, other than water, and therefore not harmful to the environment.

It is yet another object of the present invention to provide a solvent free liquid masking composition that is readily applied to surfaces; sets quickly to a dry, virtually tack-free film; can withstand baking in paint booths up to 95° C. without baking hard and is subsequently readily removable from the surfaces.

It is still another object to provide a method for protecting surfaces with a water-soluble polymeric film.

At least one or more of the foregoing objects, together with the advantages thereof over the known art relating to liquid protective coating compositions, which shall become apparent from the specification which follows, are accomplished by the invention as hereinafter described and claimed.

In general the present invention provides solvent free liquid masking compositions comprising from about 5 to about 20 percent by weight of an aliphatic polyol; from about 5 to about 20 percent by weight of a plasticizer; from about 0.1 to about 1 percent by weight of a surfactant; and sufficient water to total 100 percent by weight.

The present invention also includes a method for protecting selected surfaces from paint in painting operations which comprises applying a solvent free liquid masking composition to selected surfaces of an object where paint subsequently applied is not desired; allowing the solvent free liquid masking composition to dry, forming a film; painting the object, whereby surfaces carrying the film are protected from the application of paint; and removing the film.

PREFERRED EMBODIMENT FOR CARRYING OUT THE INVENTION

The present invention provides an environmentally acceptable solvent free liquid composition for masking selected surfaces from paint. By environmentally acceptable is meant a composition that is water-based and water-soluble. As such, the composition is free from alcohols and other volatile organic chemicals (VOC's), which makes it not only non-flammable, but also less harmful to the air and to the user.

Compounds of this type are largely employed in the automotive repair industry where the vehicle is painted, entirely or as to selected surfaces. In lieu of the time-consuming step of masking with paper, the masking compound is applied to those surfaces where paint is not desired and the vehicle is subsequently painted and baked to dry and cure the finish. Afterwards, a simple washing step removes the masking compound.

Unlike previous compounds of this type, the composition of the present invention is free from alcohols as solvents and other solvent components. Accordingly, shipping and storage requirements are less stringent; the user is not required to wear a respirator; there is no objectionable solvent odor and, objectionable solvents and VOC's are not released into the air. Additionally, because of the absence of solvent, the composition carries a significantly lower risk of staining (blushing) the paint onto which it may be applied.

As is known, liquid masking compounds are based on a film-forming compound which applies as a liquid and then readily dries to form a protective film. Typically, the film-forming compounds are aliphatic polyols and the composition of the present invention comprises from about 5 to about 20 percent by weight of an aliphatic polyol, with about 7 to about 10 percent by weight of an 85 to 90 percent hydrolyzed polyvinyl alcohol being preferred. Suitable polyvinyl alcohols (PVA's) include Elvanol 51-05, available from Dupont and Airvol 205, available from Air Products. Mixtures of aliphatic polyols can be employed.

The amount and molecular weight of the polyol will determine the viscosity and removability of the final product. The preferred viscosity should be about 20 to 200 centipoise and preferably about 50 centipoise. Typically, these PVA's have a weight average molecular weight of from about 15,000 to about 50,000. Mixtures of PVA's can also be employed.

In addition to the aliphatic polyol, composition of the present invention also comprises a plasticizer, a surfactant and sufficient water to total 100 parts by weight. The plasticizer can be selected from the group consisting of triethylene glycol, polyethylene glycol, glycerine and mixtures thereof, with glycerine being the preferred choice. Acceptable amounts of plasticizer are from 5 to about 20 percent by weight, with 7 to 10 percent (glycerine) being preferred.

For superior product performance (i.e., film build, ease of removability, protection, dry time) it is important that the ratio of polyol to plasticizer be about 3 to 1, with the ratio of 1–1.5 to 1 being preferred. If the glycerine level is too low or the ratio is too great or too small, the performance of the product will be very poor (i.e., inadequate protection, difficult removability after baking, poor drying time).

Suitable surfactants include nonionic, amphoteric and anionic species having a preferred hydrophilic-lipophilic balance (HLB) of from about 9 to about 14. Preferred surfactants are selected from the group consisting of the nonylphenoxypolyethoxyethanol based group. The surfactant should be present in a level about 0.1 to 1.0 percent by weight, with a preferred level of less than 0.5 percent. Other surfactants include ethoxlated decynediols such as Surfynol 465; alkylaryl polyethers such as Triton CF-10; octylphenoxy polyethoxy ethanols such as Triton X-100; ethoxlated alcohols such as Neodol 23-5 and Tergitol 15-S-7. The important criteria for surfactant selection is good wetting ability, water solubility/and low foam. Mixtures of surfactants can be employed.

In addition to the foregoing principal components, the composition of the present invention can also comprise one or more additional materials to enhance the characteristics of the product or its performance. These include, flash rust inhibitors, any one of a number of organic or inorganic materials used in a water-based system to prevent rust from forming on contact with the material and bare metal, one example being sodium benzoate. Another optional component includes the use of defoamers, any of an array of defoamers recommended for water-based systems to prevent unwanted foaming of the product during application. Too much foam could disrupt the required continuous film formation of the product and result in product failure. Another optional component includes the use of a fragrance; however, inasmuch as this product contains no odorous solvents, a fragrance is not as necessary in the embodiment as in other similar products on the market. However, a small amount may be added. Another optional component includes biocide products to help protect the product from bacterial attack during storage for extended periods. Finally, color may be added as an optional component for aesthetic value and to aid in identifying areas where the product has been applied. Small amounts (typically less than 1 percent by weight) of these additional materials may be added with an appropriate adjustment of the other components.

In order to prepare composition of the present invention, the polyvinyl alcohol is dispersed in cold water with mixing. The temperature of this mixture is then raised to 170 to 190° F. (77° to 88° C.) and held there for 30 minutes. The material is then cooled to less than 120° F. (49° C.) and the remaining ingredients are added (plasticizer, surfactant, flash rust inhibitor, defoamer, color, fragrance and the like).

As an example, a composition according to the present invention was prepared as follows, with all parts by weight percent unless otherwise noted. Into a suitable mixer, was charged 78.52 weight percent water and 10.65 percent Elvanol 51-05. With mixing, the temperature was brought up to 180° F. (82° C.) and mixing was continued for 30 minutes. The batch was then cooled to 110° F. (43° C.) and the following materials were added in order: glycerine, 9.34 percent; Triton N-101, 0.42 percent; sodium benzoate solution (10%) 1.04 percent; Troysan 174, 0.07 percent; fragrance, 0.04 percent and pigment, 0.005 percent.

The composition of the present invention is employed by applying in a convenient manner such as for instance, by brushing, rolling, spraying or the like. Generally, it is allowed to set or dry for about 5 to about 30 minutes in order to form the film. The composition of the present invention is formulated to remain slightly tacky after forming the film in order to trap and retain airborne dust. The vehicle can then be painted and baked or otherwise suitably dried. When the paint is adequately dried, depending upon the type of paint, atmospheric conditions, and specifications of the manufacturer, the masking film is removed by the application of water to the surfaces. Washing is generally effected under pressure alone, although certain areas where paint has built-up heavily may require hand pressure with a towel or sponge and possibly the use of a brush. The composition of the present invention can remain on the surfaces for a period of time of from about one-half to about 48 hours, which is more than adequate to allow the work to be completed.

The method of the present invention is practiced by applying a solvent free liquid masking composition to selected surfaces of an object where paint, subsequently applied, is not desired. As noted hereinabove, such application can be done in a variety of suitable manners such as spraying, brushing, rolling or the like. Next, is allowing the solvent free liquid masking composition to dry, forming a film. This step can be controlled somewhat by formulation of the composition; however, for practical uses, a time of from about 5 to about 30 minutes is sufficient. Next, the paint is applied to the object to be painted and the paint is allowed to dry. Finally, the method concludes by removing the film, simply by washing. The formulation disclosed herein is readily removed from the protected surfaces even after the object, vehicle or the like, has undergone baking to dry and harden the paint. Additionally, the composition of the present invention is more readily removed from rubber and plastic surfaces than similar products currently on the market.

Thus it should be evident that the composition and method of the present invention are highly effective in masking vehicle surfaces with a water-soluble film-forming composition. The invention is particularly suited for painting automobiles, but is necessarily limited thereto, as it can be applied to virtually any surface that requires protection from adjacent painting operations and which can be subsequently washed or otherwise treated with water to dissolve and wash away the film. The composition and method of the present invention can be employed with a variety of application equipment, methods and the like.

Because the composition is free of alcohols and other solvents, other than water, it is essentially harmless to the environment. Additionally, the components employed to formulate the composition of the present invention are essentially biodegradable which is a further environmental benefit.

Based upon the foregoing disclosure, it should now be apparent that the use of the solvent free liquid masking composition described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, compositions according to the present invention are not necessarily limited to those having PVA as the aliphatic polyol, or the specific plasticizers and surfactants disclosed herein. Thus, the scope of the invention shall include all modifications and variations that may fall within the scope of the attached claims.

What is claimed is:

1. Solvent free liquid masking compositions comprising:
   from about 5 to about 20 percent by weight of polyvinyl alcohol;
   from about 5 to about 20 percent by weight of a plasticizer;
   from about 0.1 to about 1 percent by weight of a surfactant; and
   sufficient water to total 100 percent by weight, wherein said masking composition is water-soluble and devoid of volatile organic chemicals; it is devoid of polymer resins other than polyvinyl alcohol in amounts sufficient to render the film water-insoluble and is stain resistant to applied surfaces.

2. Solvent free liquid masking compositions, as set forth in claim 1, comprising
   from about 7 to about 10 percent by weight of polyvinyl alcohol;
   from about 7 to about 10 percent by weight of glycerine;
   about 0.5 percent by weight of a nonylphenoxypolyethoxyethanol surfactant; and
   sufficient water to total 100 percent by weight.

3. Solvent free liquid masking compositions, as set forth in claim 1, wherein said plasticizer is selected from the group consisting of trietheylene glycol, polyethylene glycol, glycerine and mixtures thereof.

4. Solvent free liquid masking compositions, as set forth in claim 3, wherein said plasticizer is glycerine.

5. Solvent free liquid masking compositions, as set forth in claim 1, wherein said surfactant is selected from the group consisting of nonionic, amphoteric and anionic surfactants having a hydrophilic-lipophilic value of about 9 to 14.

6. Solvent free liquid masking compositions, as set forth in claim 5, wherein said surfactant is selected from the group consisting of ethoxlated decynediols; alkylaryl polyethers; octylphenoxy polyethoxy ethanols; ethoxlated alcohols, nonylphenoxypolyethoxyethanols and mixtures thereof.

7. Solvent free liquid masking compositions, as set forth in claim 1, having a drying time of from about 5 to about 30 minutes to form a film having sufficient tack to hold airborne dust particles.

8. A method for protecting selected surfaces from paint in painting operations comprising:
   applying a solvent free liquid masking composition to selected surfaces of an object where paint subsequently applied is not desired;
   allowing said liquid masking composition to dry, forming a film;
   painting said object, whereby surfaces carrying said film are protected from the application of paint; and
   removing said film, wherein said solvent free liquid masking composition comprises
   from about 5 to about 20 percent by weight of polyvinyl alcohol;
   from about 5 to about 20 percent by weight of a plasticizer;
   from about 0.1 to about 1 percent by weight of a surfactant; and
   sufficient water to total 100 percent by weight, wherein said masking composition is water-soluble and devoid of volatile organic chemicals; it is devoid of polymer resins other than polyvinyl alcohol in amounts sufficient to render the film water-insoluble and is stain resistant to applied surfaces.

9. A method for protecting selected surfaces from paint, as set forth in claim 8, wherein said step of allowing said composition to dry is from about 5 to about 30 minutes.

10. A method for protecting selected surfaces from paint, as set forth in claim 8, comprising
    from about 7 to about 10 percent by weight of polyvinyl alcohol;
    from about 7 to about 10 percent by weight of glycerine;
    about 0.5 percent by weight of a nonylphenoxypolyethoxyethanol surfactant; and
    sufficient water to total 100 percent by weight.

11. A method for protecting selected surfaces from paint, as set forth in claim 8, wherein said plasticizer is selected from the group consisting of trietheylene glycol, polyethylene glycol, glycerine and mixtures thereof.

12. A method for protecting selected surfaces from paint, as set forth in claim 8, wherein said plasticizer is glycerine.

13. A method for protecting selected surfaces from paint, as set forth in claim 8, wherein said surfactant is selected from the group consisting of nonionic, amphoteric and anionic surfactant having a hydrophilic-lipophilic value of about 9 to 14.

14. A method for protecting selected surfaces from paint, as set forth in claim 13, wherein said surfactant is selected from the group consisting of ethoxlated decynediols; alkylaryl polyethers; octylphenoxy polyethoxy ethanols; ethoxlated alcohols, nonylphenoxypolyethoxyethanols and mixtures thereof.

15. Solvent free liquid masking compositions consisting essentially of:
    from about 5 to about 20 percent by weight of an polyvinyl alcohol;
    from about 5 to about 20 percent by weight of a plasticizer;
    from about 0.1 to about 1 percent by weight of a surfactant; and
    sufficient water to total 100 percent by weight, wherein said masking composition is water-soluble and devoid of volatile organic chemicals and is stain resistant to applied surfaces.

16. A solvent free liquid masking composition as set forth in claim 15, consisting of said polyvinyl alcohol, said plasticizer, said surfactant and said water and a performance enhancing additive.

* * * * *